United States Patent [19]

Bolender et al.

[11] 4,303,213

[45] Dec. 1, 1981

[54] TOW PLATE

[75] Inventors: John W. Bolender, Seattle; Gerald C. Simmons, Bothell, both of Wash.

[73] Assignee: The Boeing Company, Seattle, Wash.

[21] Appl. No.: 13,755

[22] Filed: Feb. 21, 1979

[51] Int. Cl.³ ........................ B64D 1/12; B64D 17/38
[52] U.S. Cl. ........................... 244/137 R; 244/138 R; 244/151 B; 294/83 R; 294/83 A
[58] Field of Search .......... 244/137 R, 151 B, 138 R; 294/83 R, 83 A, 83 AA, 83 AB

[56] References Cited

U.S. PATENT DOCUMENTS

| | | | |
|---|---|---|---|
| 2,858,161 | 10/1958 | Smith | 294/83 |
| 2,904,369 | 9/1959 | Campbell | 294/83 R |
| 3,013,834 | 12/1961 | Minicucci | 294/83 |
| 3,149,851 | 9/1964 | Adams | |
| 3,273,459 | 9/1966 | Laroin | 244/137 R X |
| 3,578,373 | 5/1971 | Metz | 294/83 |
| 3,642,235 | 2/1972 | Criley et al. | 244/137 R |
| 3,670,999 | 6/1972 | Leger | 244/137 R |
| 3,759,562 | 9/1973 | Keich et al. | 294/83 A |
| 3,801,051 | 4/1974 | Hosterman et al. | 244/137 R |
| 3,865,333 | 2/1975 | Fielding et al. | 244/151 B |

FOREIGN PATENT DOCUMENTS 2357419  2/1978  France ........................... 244/137 R Primary Examiner—Charles E. Frankfort
Attorney, Agent, or Firm—Robert L. Gullette; Ronald E. Suter; Bernard A. Donahue

[57] ABSTRACT

A tow plate including a retention assembly and a removable clevis assembly made up of a main clevis member and a drogue clevis member engageable with the main clevis member. A first latch mechanism latches the main clevis member to the retention assembly. A second latch mechanism latches the drogue clevis member to the main clevis member. To effect force transfer, the entire clevis assembly is released by unlatching the main clevis member from the retention assembly, with the drogue clevis member latched to the main clevis member. To effect drogue jettison, the drogue clevis member alone is released by unlatching it from the main clevis member, while the main clevis member remains latched to the retention assembly.

12 Claims, 14 Drawing Figures

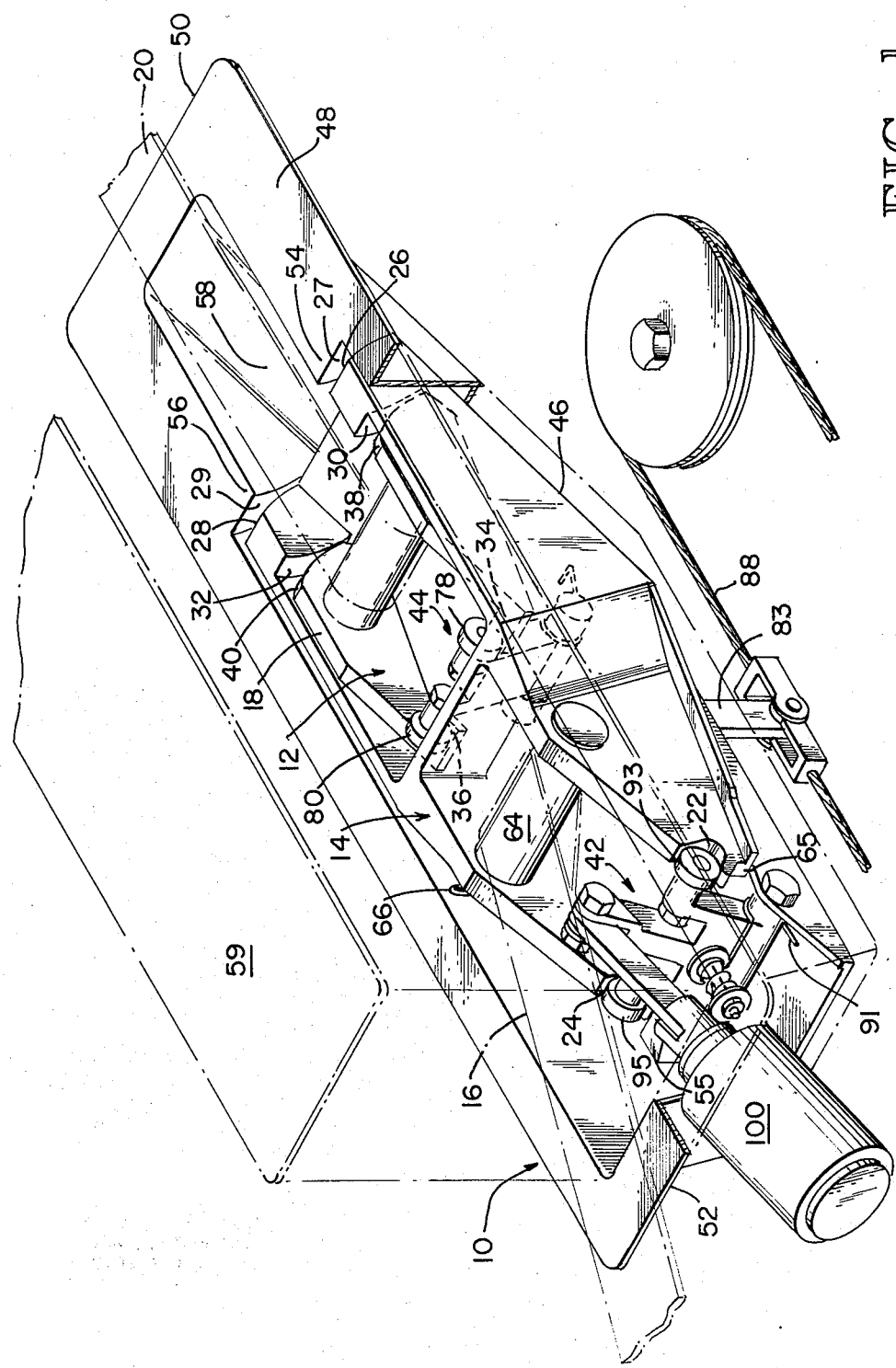

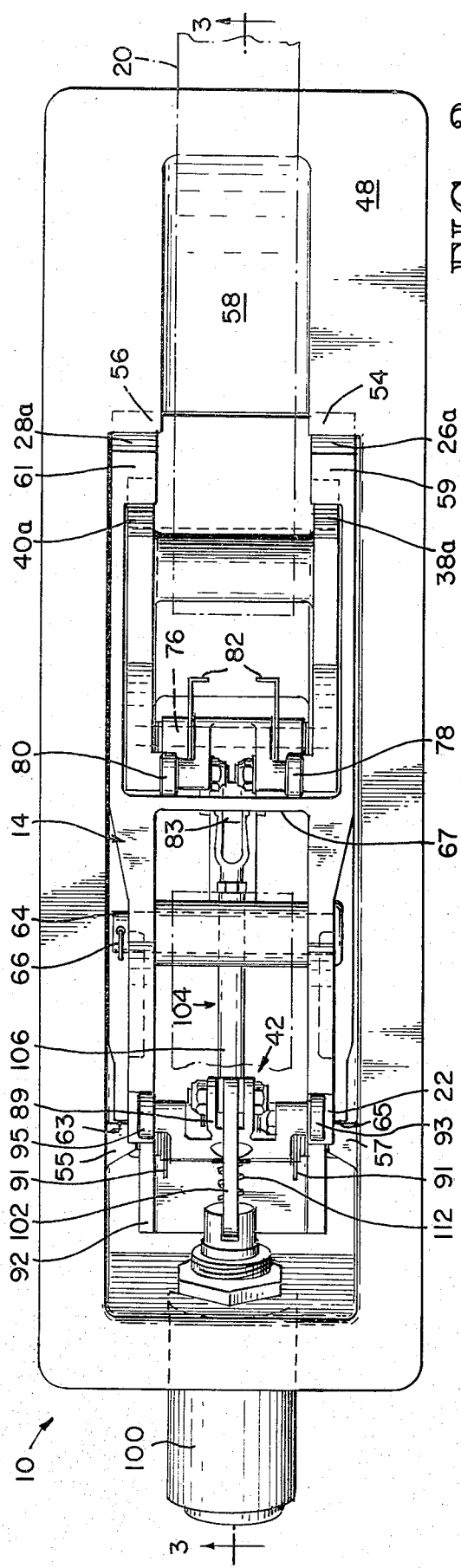

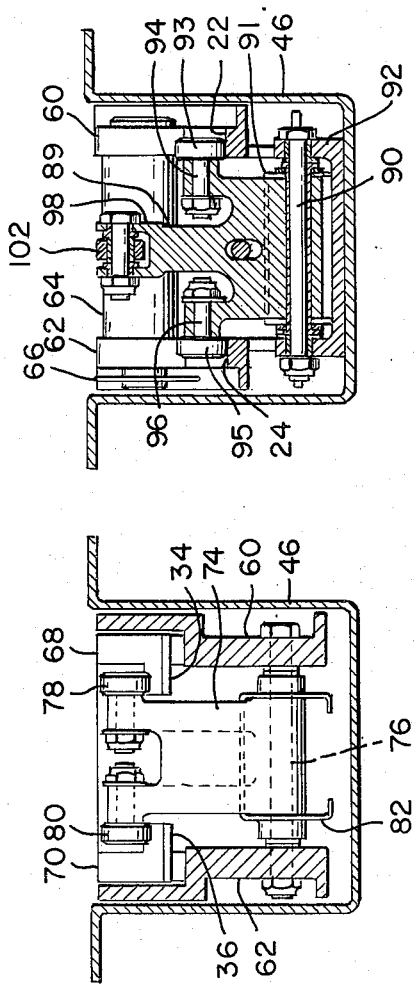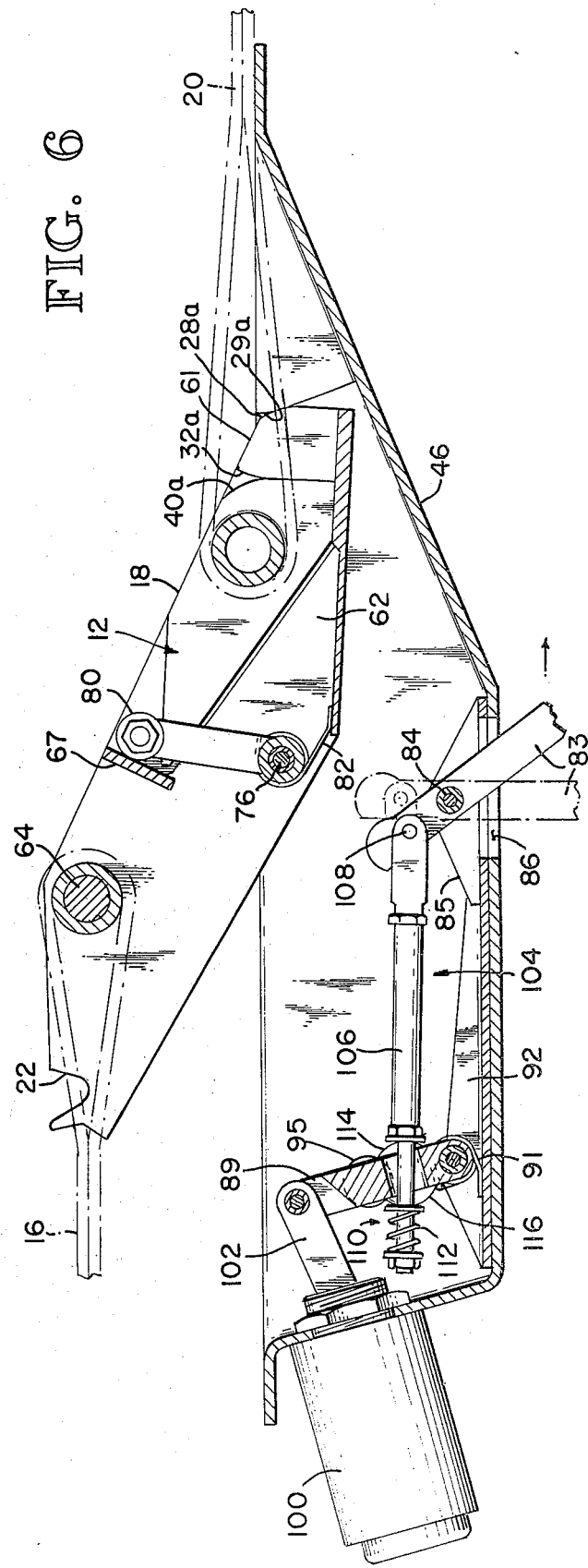

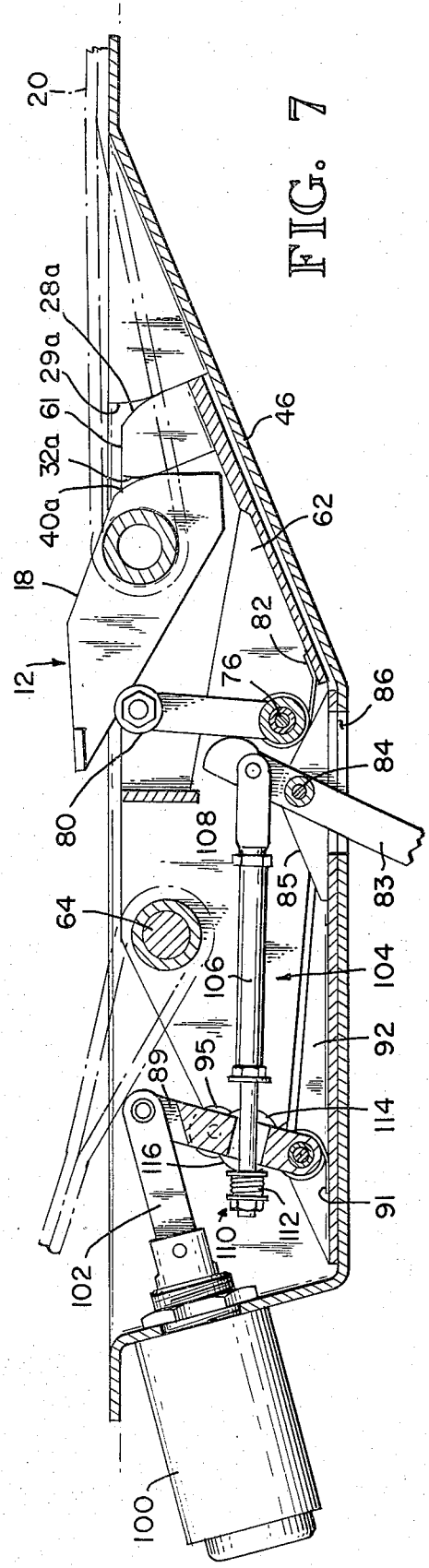
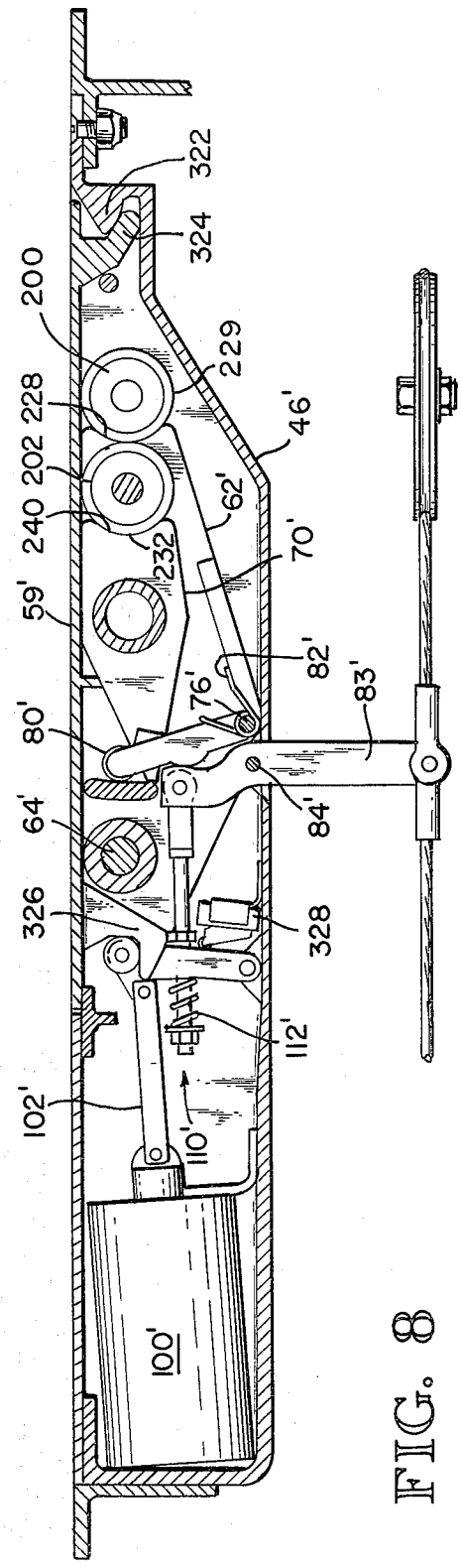

TOW PLATE

BACKGROUND OF THE INVENTION

This invention relates to cargo handling and, more particularly, to tow plates for usage in aerial cargo delivery systems. One application of the invention illustrated and described herein pertains to a tow plate for usage in a low altitude parachute extraction system (LAPES).

Low altitude airdrop of equipment or supplies according to the LAPES system is accomplished as a cargo carrying aircraft of the type having a rear-opening cargo compartment flies level at a delivery height of five to ten feet off the ground over a cargo drop location. The cargo is carried on a load bearing platform which rides upon appropriate roller trays mounted by the aircraft floor to provide low-friction load roll out at the delivery point. The loaded platform is pulled rearwardly out of the aircraft cargo compartment by an extraction force exerted by one or more deployed extraction parachutes, descends toward and contacts the ground while decelerating in an essentially level attitude responsive to the extraction force, and slides to a halt, thereby affording highly accurate and reliable cargo delivery. Upon completion of cargo extraction, the aircraft clears the extraction zone and climbs back up to a desired flight altitude.

A typical LAPES system is made up of a drogue parachute, one or more extraction parachutes connected to the cargo, and a force transfer device which is commonly referred to as a "tow plate". The tow plate includes a removable retention assembly mounted on the floor or rear loading ramp of the aircraft, and a clevis assembly connected between the drogue parachute and the extraction parachutes in force transmitting relation therewith. The drogue parachute is deployed as the aircraft descends toward the cargo delivery point and thus exerts a drag force on the clevis assembly. The retention assembly engages the clevis assembly so that this drag force is transferred to the aircraft structure without transmission to the extraction parachutes. As the aircraft begins a gradual flare toward a level flight attitude at delivery height, the retention assembly is operated by the flight crew to release the clevis assembly and, hence, the drag force applied by the drogue parachute is transferred via the clevis assembly to the extraction parachutes. This force transfer must occur before the cargo is to exit the aircraft so that the cargo has sufficient time to move rearwardly toward the rear end of the cargo compartment for delivery at the desired drop location. As will now be appreciated, the tow plate is an important element in the aforementioned LAPES system in that it must be capable of initiating cargo extraction at a precise time in order to ensure accurate cargo delivery. A critical requirement of the LAPES system is that, in the event the airdrop is aborted or the drogue parachute malfunctions, the drogue parachute can be jettisoned before force transfer to the main extraction parachutes occurs. The tow plate thus must provide reliable jettison.

One exemplary tow plate currently in use by the United States Air Force (hereinafter referred to as the "TALC" tow plate) is disclosed in United States Pat. No. 3,801,051. The TALC tow plate is operated by an actuating cable which is connected via a small winch located at the front of the aircraft cargo compartment to a pendant switch. This switch is handed through the cockpit doorway to the co-pilot and is operated by the co-pilot during a LAPES aerial cargo delivery.

The TALC tow plate is generally unsatisfactory for LAPES usage in that differences in cable slack, cable stretch and winch speed adversely affect positive operation of the tow plate at a precise time. Additionally, it is susceptible to fouling and concomitant jamming due to the accumulation of dirt and other debris incidental to loading and unloading of the aircraft. The retention assembly of the TALC tow plate includes opposed friction slides along which the clevis assembly is movable rectilinearly in a direction parallel to the longitudinal axis of the aircraft during release. In many practical applications, these slides collect sufficient debris that the clevis assembly binds or cannot be released in a positive reliable manner. Likewise, the actuating cable is susceptible to fouling and jamming due to debris accumulation and, in the event the tensile force applied by the actuating cable to operate the tow plate becomes of excessive magnitude, the manual controls become inoperative. In many practical LAPES aerial cargo deliveries, therefore, the TALC tow plate yields unsatisfactory cargo extraction.

Additionally, the TALC tow plate lacks versatility in that it is installed as a removable attachment on the upper surface of the aircraft cargo ramp or aircraft floor for LAPES usage and must be removed when the aircraft is converted to another mode of cargo transporation. Similarly, the actuating cable and associated control or drop indicator apparatus must be installed and removed when the aircraft is utilized for LAPES and other cargo transportation modes, respectively. The TALC tow plate thus creates unacceptable time and labor requirements when used in connection with aircraft which are convertible between one mode of cargo transportation and a LAPES mode. It also poses a hazard to the aircraft and flight crew in that the actuator cable and drop indicator apparatus must be strung along the aircraft floor between the cargo roller trays, where they tend to become entangled with rapidly moving load, especially during a LAPES airdrop.

A critical disadvantage of the TALC tow plate is that it tends to provide unreliable jettison of the drogue parachute. To jettison the drogue parachute, the TALC tow plate releases a rear bolt, about which the drogue parachute line is secured, while retaining a front bolt, about which the extraction parachute line is secured, thereby preventing force transfer to the latter. The rear bolt is attached to the clevis assembly adjacent its ends by two movable swing links, each pivoted at one end and securable at the other end by a removable pin. A jettison control mechanism engages and moves these pins outwardly in an axial direction with respect to the ends of the rear bolt, respectively, to release it for jettison purposes. Inasmuch as these pins must be moved under substantial load bearing forces imposed by the drogue parachute, they frequently bind up and sometimes cannot be removed at all, especially in the presence of accumulated dirt or debris, in which case the only way to jettison the drogue parachute is to cut the drogue line. As a consequence, the drogue parachute often cannot be jettisoned rapidly without endangering the aircraft or the flight crew. In the TALC tow plate, moreover, these pins are secured by destructible washers which must be replaced before the tow plate can be reused.

Another generally similar tow plate utilizes a clevis assembly which is removable to effect force transfer by rotative movement with respect to a retention assembly in response to application of a force by the drogue parachute. In this tow plate, the rear end of the clevis assembly includes two spaced apart curved surfaces which bear against mating curved surface formed by the retention assembly. These surfaces are so positioned with respect to the drogue line that the drag force applied by the drogue parachute produces a torque with respect to these curved surfaces which tends to rotate the clevis assembly upwardly and out of engagement with the retention assembly to effect force transfer. An electrically actuated latch assembly applies a counteractive force to the front end of the clevis assembly for selectively retaining it to transmit the drogue parachute force to the aircraft body, without transmission thereof to the main extraction parachutes. To effect force transfer, the latch assembly is disengaged from the front end of the clevis assembly, which thereupon is free to rotate with respect to the aforementioned curved surfaces responsive to application of torque produced by the drogue parachute drag force. This tow plate therefore is not dependent upon sliding friction to obtain release of the clevis assembly to effect force transfer.

The latter tow plate, like the TALC tow plate, tends to provide unreliable jettisoning of the drogue parachute. It includes a main clevis member and a separate drogue clevis member which fits within and is secured to the main clevis member, both including corresponding rear curved surfaces which bear against a common curved surface formed by the retention assembly. The drogue clevis member is secured within the main clevis member by a removable pin located internally of the clevis drogue line securement pin. To release the drogue clevis member, a jettison control mechanism removes this pin to permit rotation of the drogue clevis with respect to the aforementioned curved surface. Like the TALC tow plate, removal of this pin while under load often is accomplished in an unreliable manner, with attendant aircraft and flight crew hazards. Additionally, the latter tow plate, like the TALC tow plate, is mounted as a removable above-floor aircraft attachment.

SUMMARY OF THE INVENTION

This invention overcomes or substantially mitigates these and other problems associated with two plates by providing a tow plate which includes a retention assembly and a clevis assembly made up of two clevis members-a main clevis member and a releasable clevis member which may be released independently of the main clevis member, whereby the drogue parachute may be jettisoned in a highly effective and safe manner.

According to one preferred embodiment of the invention, the main clevis member is connectable to the main extraction parachute or parachutes and the releasable or drogue clevis member is connectable to the drogue parachute. Preferably, the drogue clevis member is insertable within the main clevis member. The main and drogue clevis members each includes at least one front latching surface, preferably a pair of spaced apart corresponding latching surfaces. Two independently operable latching mechanisms engage the latching surfaces of the main and drogue clevis members, respectively. The retention assembly is mountable by the aircraft structure and includes at least one and preferably a pair of backstops which retain and support the rear end of the main clevis member. The main clevis member likewise includes one or more backstops which retain and support the rear end of the drogue clevis member, respectively. These backstops include curved load bearing surfaces which engage cooperating curved rear surfaces on the respectively associated clevis members to allow the clevis members to rotate about their rear ends during release. Preferably, each of these load bearing surfaces includes a curved portion with respect to which the respectively associated clevis member can roll during release, and an inclined rectilinear portion which underlies the curved portion and which acts to retain the clevis member until release. The term "rear" as used herein refers to end of the tow plate with respect to the force applied by the drogue parachute. The term "front" as used herein refers to the opposite end of the tow plate which faces one or more main extraction parachutes or the load to be extracted, as the case may be. These terms are not intended to limit usage of the tow plate to a particular orientation, location, or environment.

To effect transfer of the extraction force from the aircraft structure to the extraction chutes, the clevis assembly is released by operating the latching mechanisms to release the main clevis member while maintaining the drogue clevis member in force transferring engagement therewith. To jettison the drogue parachute, however, the drogue clevis member latching mechanism is operated to release the front end of the drogue clevis member, thereby permitting it to rotate out of engagement with the main clevis member. This construction therefore does not utilize and eliminates the use of internally or axially movable pins or like restraining members for effecting jettison of the drogue parachute.

According to further aspects of the invention, the retention assembly includes a pan within which the clevis assembly is insertable and latchable. This pan is adaptable to be mounted flush or below the upper surface of the aircraft floor or loading ramp, as the case may be, as a permanent aircraft fixture. A top cover may be secured to and close the top of the pan when the tow plate is not in use. During release, the main clevis member moves up and out of this pan by rotating about its rear load bearing surfaces.

Thus, it will be appreciated from the foregoing summary that the tow plate of this invention provides highly reliable yet safe operation in both normal release and jettison release and may be utilized as a permanent aircraft fixture which does not impede operation of the aircraft in a variety of cargo handling modes. Since the clevis assembly may be constructed so that the latch mechanisms are subjected to low magnitude operating forces, the tow plate of this invention further may be adapted for operation in both normal release and jettison release by appropriate electrical actuators. The tow plate of this invention therefore provides unparalleled LAPES operation.

Additionally, this invention may be used to improve the accuracy and safety of high altitude aerial cargo delivery system. In this instance, the tow plate of this invention may be utilized to provide force transfer from one or more deployed extraction parachutes, each of which is customarily of greater size and hence greater force producing capacity than a conventional drogue parachute, directly to the cargo. To this end, the tow plate may be provided with load bearing surfaces of increased area to withstand much larger magnitude forces than heretofore possible.

It will be recognized that the main clevis member could be separated from the aircraft to effect force transfer by allowing it to move directly along the drag force vector, without substantial rotation. In this instance, of course, the retention assembly backstops could be retractable. It will also be recognized that the tow plate could be used with other deployable extraction devices besides parachutes.

These and other features, objects, and advantages of the present invention will become apparent from the detailed description and claims to follow, taken in conjunction with the accompanying drawings in which like parts bear like reference numerals.

BRIEF DESCRIPTION OF THE DRAWINGS

FIG. 1 is a perspective view of a tow plate according to this invention;

FIG. 2 is a top plan view of the FIG. 1 tow plate;

FIG. 3 is a section taken along the line 3—3 in FIG. 2;

FIG. 4 is a section taken along the line 4—4 in FIG. 3;

FIG. 5 is a section taken along the line 5—5 in FIG. 3;

FIG. 6 is a section generally similar to FIG. 3, depicting operation of the FIG. 1 tow plate in a normal release (force transfer mode);

FIG. 7 is generally similar to FIG. 6, depicting operation of the FIG. 1 tow plate in a jettison release (drogue jettison mode);

FIG. 8 is a section generally similar to FIG. 3 of a second preferred embodiment of the tow plate of this invention;

DETAILED DESCRIPTION OF THE DRAWINGS

Figure 11:
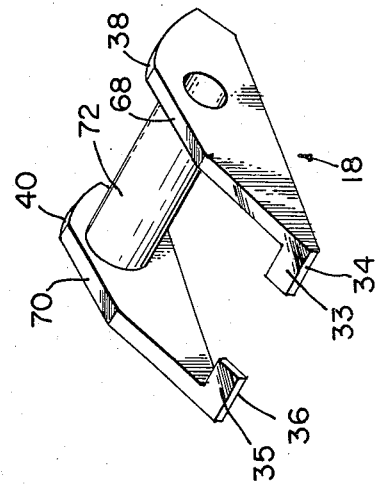
FIG. 11 is a perspective view of the drogue clevis member of the FIG. 1 tow plate.

Referring first to FIG. 1 of the drawings, the illustrated tow plate includes a retention assembly (generally referenced by numeral 10) and a removable clevis assembly (generally referenced by numeral 12). Assembly 12 is made up of two clevis members, a main clevis member 14 connectable to the main extraction parachute or parachutes (not shown) or directly to the load by line 16, and a drogue clevis member 18 connectable to the drogue or main extraction parachute(s) (not shown) by line 20, as the case may be. The main clevis member 14 includes a pair of upwardly facing front latching surfaces 22, 24 and a pair of backstops or rear load bearing surfaces 26, 28. Member 14, additionally includes two spaced apart backstops or inner load bearing surfaces 30, 32 adjacent the interior of its rear end. The drogue clevis member 18 is generally similar to member 14 but has an outline which registers with the interior thereof such that member 18 is insertable within member 14 in parallel alignment therewith, as shown (FIG. 1). Member 18 includes two upwardly facing latching surfaces 33, 35 (see FIG. 11) which are formed by the upper surfaces of inwardly projecting front shoulders 34, 36. Member 18 also includes two rear load bearing surfaces 38, 40 which respectively bear against and are supported by surfaces 30, 32 when members 14 and 18 are engaged as illustrated. In the FIG. 2 example, surfaces 26, 28, 38, and 40 are similar in profile, as are surfaces 27, 29, 30, and 32 and will be described in greater detail hereinafter. Two independently operable latching mechanisms (referenced generally by numerals 42 and 44 in FIG. 1) are engagable with latching surfaces 22, 24, and 33, 35, for independently releasing assembly 12 and member 18 to effect force transfer or drogue jettison, respectively, as will be described hereinafter.

Figure 10:
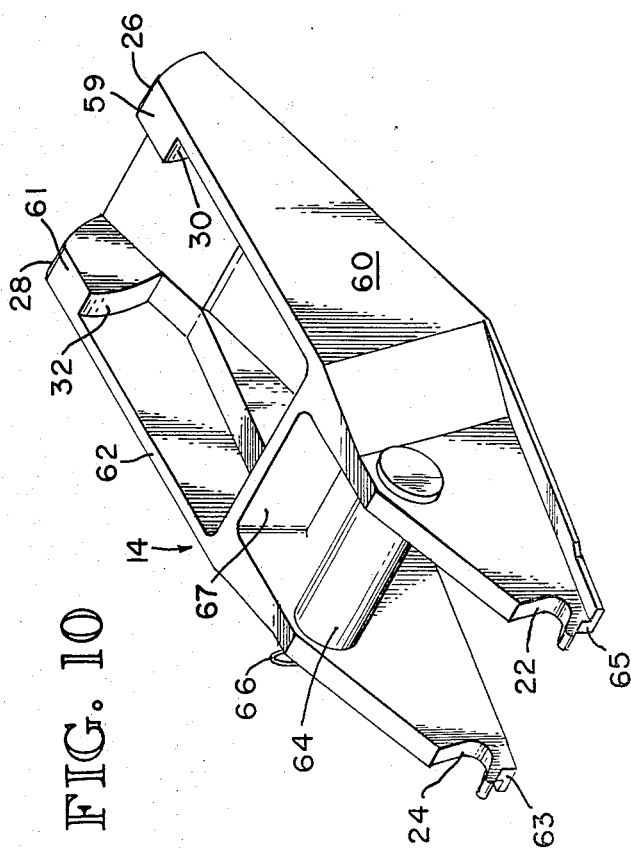
FIG. 10 is a perspective view of the main clevis member of the FIG. 1 tow plate.

Referring to FIGS. 1-3, the retention assembly includes an open topped pan 46 adapted to be mounted in force transmitting relation with the floor or cargo ramp of an aircraft in which the tow plate of this invention is utilized. The pan includes a peripheral upper flange 48 adapted to be mounted in coplanar or recessed relation with the upper surface of the aircraft floor or ramp, as the case may be. The pan is elongated as shown and is mounted by the aircraft with its length parallel to the longitudinal axis of the aircraft with the rear end thereof (referenced by numeral 50 in FIG. 1) facing the direction of the extraction force. The forward portion of the pan (referenced by numeral 52) forms a recess of sufficient depth to receive assembly 12 which, when received within the pan, is located below the upper surface of flange 48. The rear portion of the pan includes two spaced apart backstops 54, 56 which form surfaces 27, 29, and an intervening inclined surface 58. Backstops 54 and 56 are spaced apart a distance sufficient to permit passage of the drogue parachute line therebetween. A cover 59 is engagable with pan 46 to enclose the top thereof. The pan additionally may include two spaced apart shoulders 55, 57 (FIGS. 1, 2) which project inwardly from the forward end thereof for contact with appropriate stop surfaces 63, 65, formed, for example, on the front end of the main clevis member 14, in underlying relation with surfaces 24, 22, as shown (FIGS. 1, 10). Shoulders 55, 57 contact stop surfaces 63, 65 in order to position member 14 within the pan. In one preferred LAPES application, the pan is mounted in the deployable rear ramp of the aircraft or adjacent the rear cargo doors thereof; however, in other applications and environments, the tow plate may be mounted in other locations.

Referring to FIG. 10, the main clevis member 14 includes spaced apart parallel sidewalls 60, 62 which terminate in rear backstops 59, 61. (The sidewalls and backstops form the latching and load bearing surfaces already described, as indicated by like reference numerals.) A transverse partition 67 extends between and connects sidewalls 60, 62 intermediate the ends therof. A line retention pin 64 extends between the sidewalls through opposed circular openings therein and is retained in transverse alignment with the longitudinal axis of member 14 by a locking pin 66 which projects through and secures the exposed end portion of the pin adjacent the exterior of sidewall 62. To secure the main parachute line to member 14, pin 64 is removed, inserted through a loop in the end of the parachute line, and is reinserted in the sidewall openings. Pin 66 thereafter is secured to pin 64 to retain it in the position illustrated.

Referring to FIG. 11, the drogue clevis member 18 is generally similar in construction to the member 14 and includes spaced apart parallel sidewalls 68, 70 which are interconnected by a transverse drogue line pin 72. In the example, sidewalls 68, 70, and pin 72 are formed as an integral structure. To secure the drogue line to member 18, the front end of one sidewall is inserted through the drogue line loop, which thereupon is moved along the length of that sidewall until contacting pin 72. The loop is now rotated and moved toward the opposite sidewall until surrounding pin 72.

As most clearly illustrated in FIG. 3, surfaces 28, 29, 32, 40 include oppositely curved upper portions (designated by identical reference numerals with suffix letter "a") which promote rearward rotation of the clevis assembly or drogue clevis member toward a release position. Surface portions 29a and 32a curve rearwardly and portions 28a and 40a curve forwardly, as shown. Surfaces 28, 29, 32, and 40 also include lower rectilinear portions (designated by identical reference numerals with suffix letter "b") which are parallel but are so inclined with respect to the force vector of the drag force applied via line 20 that, with the forward end of the clevis assembly or drogue clevis member restrained, these surfaces will tend to be wedged downwardly in a direction substantially perpendicular to this force vector to obtain positive retention. Surfaces 26, 27, 30, 38 are identical in outline and configuration to surfaces 28, 29, 32, 40 and similarly promote rotation and retention of the clevis assembly and drogue clevis member, as the case may be.

Referring now to FIGS. 1-4, latching mechanism 44 acts between the main clevis member 14 and the drogue clevis member 18. Mechanism 44 is comprised of a lever 74 which is pivotally supported at its lower end by a shaft 76 mounted between the sidewalls 60, 62 and which terminates at its upper end in a pair of projections which respectively mount a pair of spaced apart rollers 78, 80. Coil torsion springs 82 surrounding the ends of shaft 76 and constrained between member 14 and lever 74 urge lever 74 in a forward direction (counter-clockwise as illustrated in FIG. 3) toward a latching position with respect to member 18. In this position, rollers 78, 80 abut against and are positioned by partition 67 so as to overlie and apply a downwardly directed retaining force to latching surfaces 33, 35, respectively. An operator 83 is pivotally supported by a shaft 84 intermediate its length, shaft 84 being mounted by a support 85 upstanding from the bottom surface of pan 46. Operator 83 extends upwardly through an opening 86 in pan 46 for contact at its upper end with lever 74 to move lever 74 in a rearward direction (or clockwise as illustrated in FIG. 3) against the bias of spring 82 until rollers 78, 80 are located to the rear of and are removed from overlying engagement with latching surfaces 33, 35, thereby releasing the front end of the drogue clevis member to effect jettison of the drogue parachute as will be described presently. Operator 83 is movable by a bi-directional cable actuator 88 (FIG. 1) which is secured to and moves the lower end of operator 83 fore and aft. (Aft movement effects backup normal release and forward movement effect jettison release, as will be described presently.)

Referring to FIGS. 1-3 and 5, latching mechanism 42 acts between pan 46 and the main clevis member 14. Mechanism 42 includes a lever 89 which is pivotally supported adjacent its lower end by shaft 90 which is mounted by a support 92 upstanding from the bottom surface of pan 46. As most clearly illustrated in FIG. 5, rollers 93, 95 are supported by respective shafts 94, 96 intermediate the length of lever 89. Lever 89 terminates at its upper end in a forked-shaped portion 98. Coil torsion springs 91 surrounding the ends of shaft 90 and constrained between pan 46 and lever 89 urge lever 89 in a rearward direction toward a latching position with respect to member 14. In this position, rollers 93, 95 are engaged within and apply a downwardly directed retaining force to latching surfaces 22, 24, respectively. An electrical actuator 100, such as a solenoid, is connected by a link 102 with portion 98, as shown (FIG. 3). When operated, actuator 100 moves lever 89 in a forward direction (or counter-clockwise as illustrated in FIG. 3) to remove rollers 93, 95 from engagement with latching surfaces 22, 24, and thereby release the front end of the main clevis member to effect force transfer, as will be described presently.

Still referring to FIG. 3, a backup release assembly 104 alternately moves lever 89 to release the main clevis member. Assembly 104 includes a connecting link 106 acting between lever 89 and operator 83. Link 106 is connected at its rear end by pin 108 to operator 83. It is connected at its front end to lever 89 by a lost motion coupling 110 constituted by a compression spring 112 and a spaced apart shoulders 114, 116 on opposite faces of lever 89.

To effect force transfer from the drogue parachute line 20 to the extraction parachute(s) via lines 20 and 16, the latch mechanism 42 is operated to release the front end of the clevis assembly. In response to an electrical control signal produced by an appropriate flight crew operated control not shown, actuator 100 rotates lever 89 in a forward direction (or in a counterclockwise direction as illustrated in FIG. 3) toward a release position wherein rollers 93, 95 are removed from overlying engagement with latching surfaces 22, 24, permitting the clevis assembly 12 to be lifted out of pan 46 by rotation in a rearward direction about surfaces 27, 29, as illustrated in FIG. 6, responsive to the torque applied with respect to these surfaces by the rearward force exerted on line 20 by the deployed drogue parachute. In this instance, of course, latch mechanism 44 continues to latch the front end of the drogue clevis member which is thereby retained within the main clevis member in force transmitting relation therewith. Coupling 110 absorbs forward movement of lever 89 so that operator 83 remains in the FIG. 6 broken line position.

The backup release assembly 104 alternatively acts to release the clevis assembly by effecting forward rotation (or counterclockwise as illustrated) of lever 89 independently of actuator 100. This is accomplished by moving the lower end of operator 83 aft, so as to rotate operator 83 in a counterclockwise direction to the position illustrated in solid lines FIG. 6, thereby moving link 106 forwardly for applying a forward force to lever 89. It will be recognized that a bi-directional electrical actuator could be substituted for the cable actuator illustrated.

To jettison the drogue parachute, latch mechanism 44 is operated to release the front end of the drogue clevis member. Operator 83 is rotated in a clockwise direction to the FIG. 7 position thereof by actuator 88. Lever 74 is thereupon rotated rearwardly toward a release position wherein rollers 78, 80 are removed from force bearing engagement with latching surfaces 33, 35, permitting the drogue clevis member to be lifted out of the main clevis member by rotation in a rearward direction about surfaces 30, 32 as illustrated in FIG. 7, responsive to the aforementioned torque. The drogue clevis member thus rotates with respect to the rear end of and becomes disengaged from the main clevis member through movement in manner generally similar to that of the clevis assembly during a normal force transfer operation. In this instance, of course, the main clevis member is retained within pan 46 by latch mechanism 42. The lost motion coupling absorbs the rearward force applied by link 106 by compressing spring 112 responsive to rearward movement of link 106.

The tow plate illustrated in FIGS. 1–7 is suitable for usage with one 15-foot drogue parachute, one 28-foot main extraction parachute, or two 28-foot main extraction parachutes. The clevis members should be of sufficient lengths that the torque developed by the drag force can be overcome by application of downward counteractive forces by the respectively associated latch mechanisms which do not exceed the load bearing capabilities of the material used to form the latching surfaces and underlying portions of the clevis members. Likewise, the areas of the load bearing surfaces should be sufficient to withstand the loads applied. Accordingly, the construction of the clevis members and retention assembly may vary, depending upon the parachutes (or other drag force application means) used.

A second preferred embodiment of the tow plate of this invention is illustrated in FIG. 8 wherein parts corresponding to those already illustrated and described with respect to the FIG. 1 tow plate are referenced with the same reference numerals, primed, and accordingly these parts are not described further hereinafter. The FIG. 8 tow plate is generally similar to the FIG. 1 tow plate, except that a roller 200 is mounted rotatively by pan 46' and forms a curved surface 229 for face-to-face engagement with a curved surface 228 formed by the rear end of sidewall 62'. Likewise, a roller 202 is mounted rotatively by sidewall 62' and forms a curved surface 232 for face-to-face engagement with a curved surface 240 formed by the rear end of sidewall 70'. Surfaces 228, 229, and 232 and 240 are curved rearwardly in parallel alignment. Two additional identical rollers not shown form curved surfaces which engage corresponding curved surfaces on sidewalls 60' and 62'. The provision of rollers and curved clevis member surfaces tends to reduce frictional forces during disengagement of the clevis assembly or drogue clevis member during normal force transfer or jettison, as the case may be, with some loss of retention capability under extreme loads. The load bearing capabilities of the FIG. 8 tow plate are less than that of the FIG. 1 tow plate in view of the nature of the attachment of the rollers to their respectively associated sidewalls and therefore the FIG. 8 tow plate is principally suited for usage with one 15-foot drogue parachute.

The FIG. 8 tow plate additionally is adapted to lock cover 59' in place. It includes a rear shoulder 322 which forms an underlying recess within which a projection 324 from the underside of the cover 59' is insertable to secure the rear end thereof. The cover further includes a forward projection 326 which is engagable with latch mechanism 42' to secure the front end of cover 59', as shown (FIG. 8). To release the cover in preparation for LAPES usage, this latch mechanism 42' is operated as described hereinabove with respect to a force transfer operation. The clevis assembly normally is not located in the pan while the cover is in place as illustrated in FIG. 8 and is inserted therein after removal of the cover. An electrical sensor 328 may be provided for sensing the position of lever 89' and presents a signal indicative that the clevis assembly is latched. Sensor 328 thus signals whether the tow plate is in a safe condition. The FIG. 1 tow plate of course, could include a generally similar cover locking mechanism, or a sensor, or both.

Figure 9:
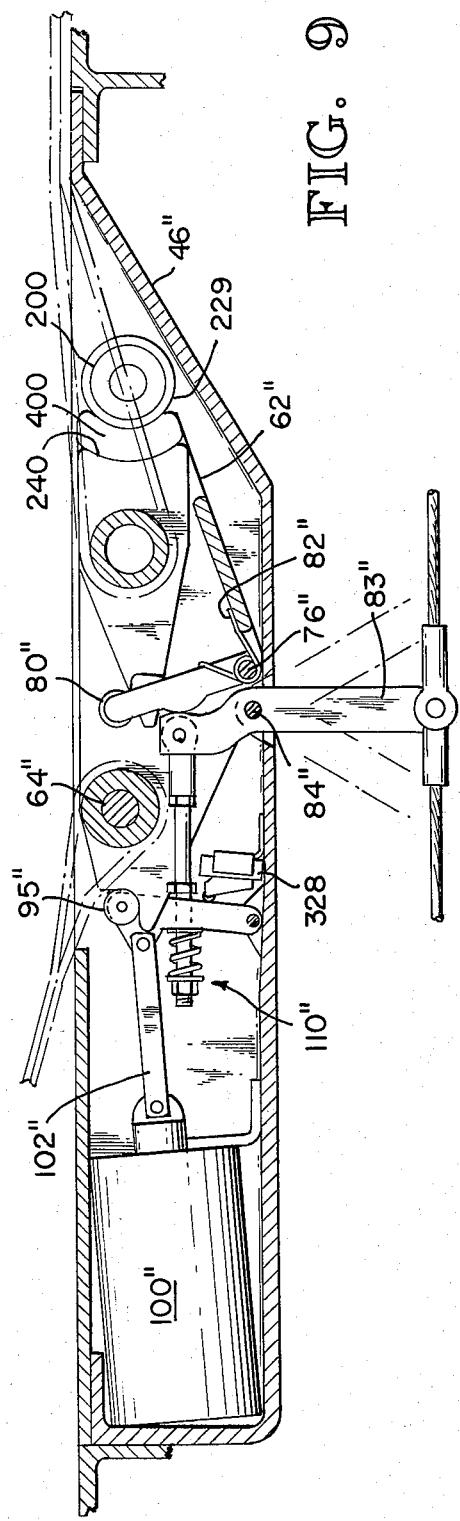
FIG. 9 is a section generally similar to FIG. 3 of a third preferred embodiment of the tow plate of this invention.

A third preferred embodiment of the tow plate according to this invention is illustrated in FIG. 9 in which parts corresponding to those already illustrated and described with respect to the FIG. 1 tow plate are referenced with the same reference numerals, double primed, and accordingly these parts are not described further hereinafter. The FIG. 9 tow plate is generally similar to the FIG. 8 tow plate, except that the curved load bearing surfaces referenced 229 and 232 in FIG. 8 are formed by a backstop 400 which projects inwardly from the rear end of sidewall 62''. A second identical shoulder not shown projects inwardly from sidewall 60''.

Figure 13:
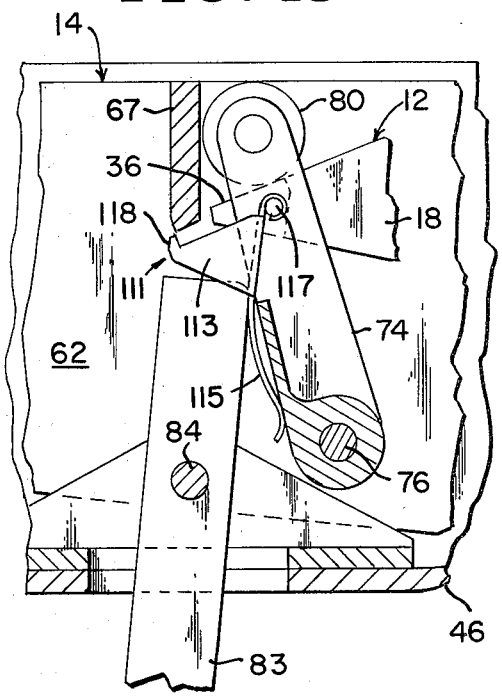
FIG. 13 is generally similar to FIG. 12, depicting the mechanism in its advanced unlatched position.
Figure 14:
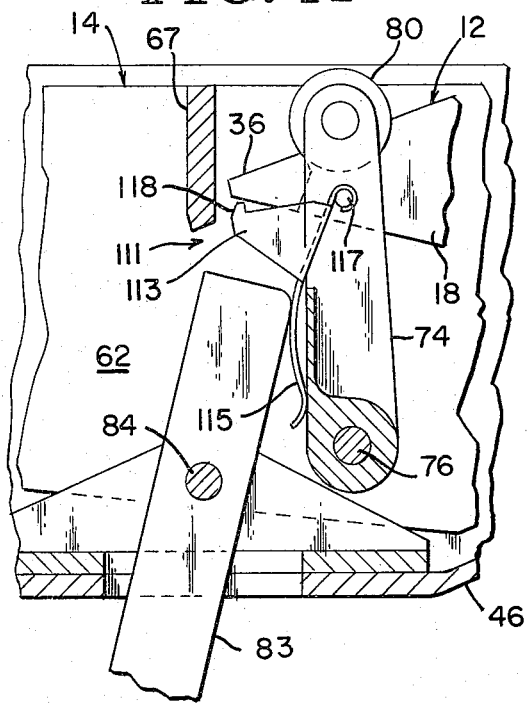
FIG. 14 is generally similar to FIG. 12, depicting the mechanism in its retracted release position.
Figure 12:
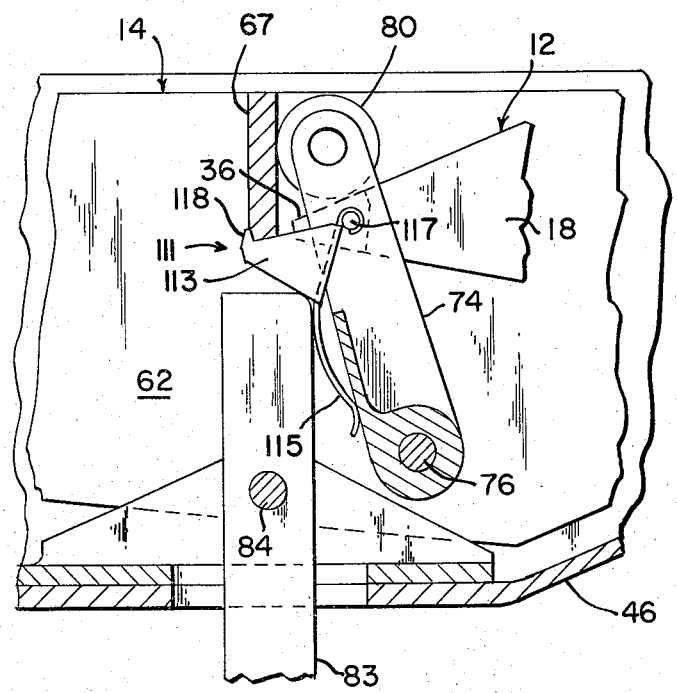
FIG. 12 is a side elevation, partly in section, of a modified drogue clevis latching mechanism, depicting the mechanism in its advanced latched position.

Referring to FIGS. 12–14, latching mechanism 44 may include a lock assembly (generally referenced 111) for positively locking mechanism 44 in its advanced latched position until a drogue jettison is effected by operator 83. Assembly 111 includes a detent 113 which is mounted by a leaf spring 115 secured to lever 74 at its upper end by pin 117. Spring 115 normally urges detent toward an extend position in which its distal end 118 engages the lower edge of partition 67 when lever 74 is located in its FIG. 12 position. As depicted in FIGS. 13 and 14, operator 83 contacts and deflects the midportion of spring 115 when rotated toward its release or drogue jettison position, thereby causing detent 113 to disengage from partition 67.

Although three preferred embodiments of the invention have been illustrated and described herein, variations will become apparent to one of ordinary skill in the art. For example, the load bearing surfaces could be formed to intersect the drag force vector so as to reduce or eliminate torque applied to one or both clevis members. The associated latching mechanisms thus could be designed to withstand lower magnitude forces; however, they would require additional displacement members to lift the front end of the associated clevis member sufficiently during release to establish a torque therein to complete release. Accordingly, the invention is not to be limited to the specific embodiments illustrated and described herein, and the true scope and spirit of the invention are to be determined by reference to the appended claims.

The embodiments of the invention in which an exclusive property or privilege is claimed are defined as follows:

1. A tow plate for use in an aerial cargo delivery system wherein an object is extracted from a moving aircraft by a drag force exerted by extraction means deployed rearwardly therefrom, said tow plate comprising: a clevis assembly connectable between the object and the extraction means and a retention assembly for selectively retaining said clevis assembly to transmit the drag force to the aircraft and releasing said clevis assembly to transmit the drag force to the object;

said clevis assembly including a main clevis member connectable to the object and having a front end and a rear end, a drogue clevis member connectable to the extraction means and having a front end and a rear end, remotely actuatable latch means acting between said main clevis member and said drogue clevis member for selectively securing and releasing said front end of said drogue clevis member and said main clevis member, said latch means include a latching mechanism having roller means engagable with said front end of said drogue clevis member in overlying relation therewith in a retention position and backstop means operatively connected with said main clevis member for retaining said rear end of said drogue clevis member while said front end of said drogue clevis member is secured;

said retention assembly including means for selectively securing and releasing the front end of said main clevis member, means for selectively actuating said latch means and backup means for interconnecting said securing means and said actuating means, said actuating means being capable of moving said roller means toward a release position disengaged from said front end of said drogue clevis member;

said latch means and said backstop means permitting said drogue clevis member to rotate in a rearward direction about said rear end of said drogue clevis member toward a jettisoned position separated from said main clevis member when said front end of said drogue clevis member is released, whereby said extraction means may be jettisoned.

2. The tow plate of claim 1, wherein said main clevis member includes a recess adapted to receive said drogue clevis member with the rear end thereof adjacent the rear end of said main clevis member, said backstop means projecting inwardly from said main clevis member for engagement with the rear end of said drogue clevis member within said recess and permitting said drogue clevis member to rotate out of said recess when the front end of said drogue clevis member is released.

3. The tow plate of claim 2, wherein said backstop means include at least one surface which curves rearwardly, and the rear end of said drogue clevis member includes a surface which is contactable with said at least one surface in face-to-face relation.

4. The tow plate of claim 2, wherein said backstop means include at least one surface having a flat lower portion and a curved upper portion which curves rearwardly, and the rear end of said drogue clevis member includes a surface having a flat lower portion and a curved upper portion which curves forwardly, said flat lower portions being contactable in face-to-face relation and inclined to the direction of application of the drag force to urge said drogue clevis member into engagement with said main clevis member.

5. The tow plate of claim 1 or 2, wherein said retention assembly includes second backstop means for retaining the rear end of said main clevis member while the front end thereof is secured and permitting said main clevis member to rotate in a rearward direction about its rear end when its front end is released, whereby the drag force may be transferred to the object while continuing to secure the front end of said drogue clevis member and continuing to retain the rear end thereof with respect to said main clevis member.

6. The tow plate of claim 5, wherein said second backstop means include at least one surface which curves rearwardly, and the rear end of said main clevis member includes a surface which is contactable with said at least one surface in face-to-face relation.

7. The tow plate of claim 5, wherein said second backstop means include at least one surface having a flat lower portion and a curved upper portion which curves rearwardly and said main clevis member includes at least one surface having a flat lower portion and a curved upper portion which curves forwardly, said flat lower portions being contactable in face-to-face relation and inclined to the direction of application of the drag force to urge said main clevis member into engagement with the retention assembly.

8. The tow plate of claim 1, wherein said drogue clevis member includes two spaced apart shoulders which form two latching surfaces adjacent said front end, and wherein said roller means include two rollers respectively engagable with said two latching surfaces, said actuating means being operative to move said roller means in a rearward direction toward said release position.

9. The tow plate of claim 1 or 2, wherein said retention assembly includes a pan forming a recess adapted to receive said clevis assembly, and cover means positionable at a closure position in overlying relation with said recess for closing said recess and forming a load bearing surface which may be conformed with a portion of the aircraft when said cover means are positioned at said closure position.

10. The tow plate of claim 9, wherein said retention assembly further includes second backstop means for retaining the rear end of said main clevis member while the front end thereof is secured and permitting said main clevis member to rotate in a rearward direction out of said recess about its rear end when its front end is released, whereby the drag force may be transferred to the object while continuing to secure the front end of said drogue clevis member and continuing to retain the rear end thereof with respect to said main clevis member.

11. The tow plate of claim 10, wherein said retention assembly includes means for contacting and positioning the front end of said main clevis member in registration with said recess.

12. The tow plate of claim 8 wherein said latching mechanism includes means responsive to said actuating means for locking said roller means at their retention position until unlocked by said actuating means.

* * * * *